(No Model.)

L. J. F. W. SCHARBAU.
MACHINE FOR BOLTING FLOUR OR OTHER PULVERIZED SUBSTANCES.

No. 299,684. Patented June 3, 1884.

Witnesses:
Carl Keirn
Martin Petry

Inventor
Louis J. F. W. Scharbau
by Goepel & Riegener
Attorneys.

United States Patent Office.

LOUIS JOHANNIS FRIEDERICH WILHELM SCHARBAU, OF HAMBURG, GERMANY.

MACHINE FOR BOLTING FLOUR OR OTHER PULVERIZED SUBSTANCES.

SPECIFICATION forming part of Letters Patent No. 299,684, dated June 3, 1884.

Application filed January 18, 1884. (No model.)

*To all whom it may concern:*

Be it known that I, LOUIS JOHANNIS FRIEDERICH WILHELM SCHARBAU, a subject of the Emperor of Germany, and a resident of Hamburg, in the German Empire, have invented certain new and useful Improvements in Machines for Bolting Flour or other Pulverized Substances, of which the following is a specification.

My invention relates to an improved machine for bolting flour and other pulverized substances, said bolting-machine having a large sifting-surface, through which the meal or other pulverized substance is rapidly impelled by centrifugal force; and the invention consists of an interior horizontally-corrugated cylinder having exterior spiral beaters, which cylinder is revolved in opposite direction to a surrounding bolting cylinder or reel having concentric corrugations. The bolting-reel is inclosed by a casing or box, which is provided at the top with a supply-pipe, which conducts the meal to the space between the interior cylinder and reel, and at the bottom with discharge-pipes that conduct the bolted flour and unscreened portions to the outside. The bottom of the reel is provided with scrapers, which move the flour and meal to the discharge-pipes.

Figure 1:
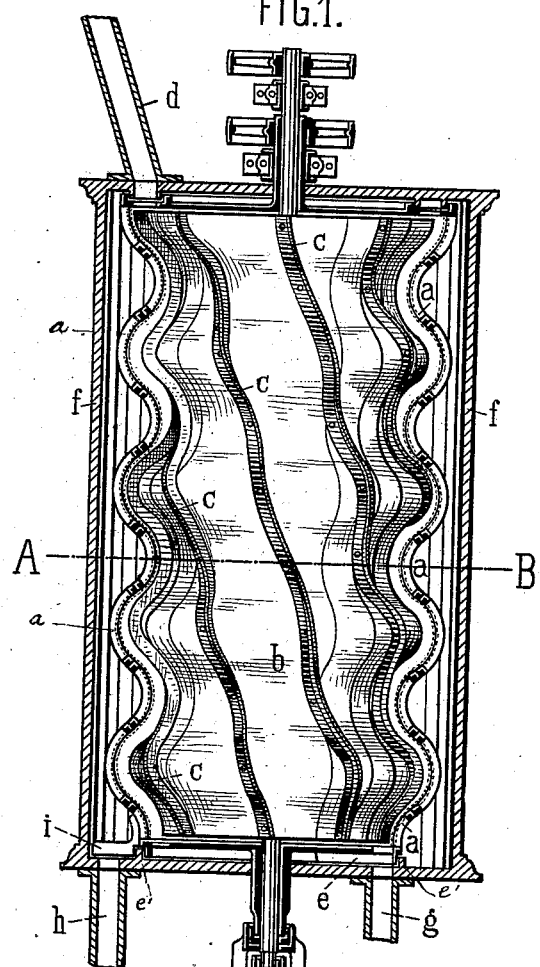
Figure 2:
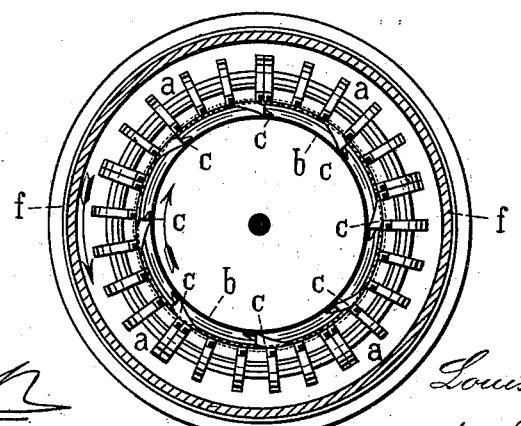

In the accompanying drawings, Figure 1 represents a vertical central section of my improved flour-bolting machine; and Fig. 2 is a horizontal section on line A B, Fig. 1.

Similar letters of reference indicate corresponding parts.

My improved flour-bolt is constructed of an interior cylinder, $b$, which is closed at the top, bottom, and sides, and made of sheet metal or other suitable material. The cylinder $b$ is provided with horizontal corrugations, so as to form alternating concave and bulging portions. The shaft of the cylinder $b$ turns in suitable step and neck bearings, as shown in Fig. 1. The cylinder $b$ is provided at its outer surface with fixed spiral beaters $c$, which are bent so as to correspond to the corrugations of the cylinder. The cylinder $b$ is surrounded by a bolting-reel, $a$, the frame of which is covered at the inside with bolting-cloth, and which is provided with corrugations concentric to those of the cylinder $b$. The top and bottom of the reel $a$ are arranged with ring-shaped openings vertically above and below the space inclosed between the cylinder $b$ and reel $a$. The bolting-reel $a$ is revolved in opposite direction to the cylinder $b$, its hollow shaft being supported, like the shaft of the cylinder $b$, in suitable step and neck bearings, as shown in Fig. 1. The reel $a$ is again inclosed by a cylindrical box or casing, $f$, which is provided at the top with a supply-pipe, $d$, through which the meal is conducted through the ring-shaped opening in the top of the reel to the space between the cylinder $b$ and the reel $a$ and delivered into the channels formed by the beaters $c$. The meal is conducted by the beaters along the surface of the reel in a spiral line and thrown by centrifugal force exerted thereon by the rotation of the cylinder $b$ toward the bolting-cloth, so as to be sifted through the same. The bolted flour settles at the bottom of the box $f$, and is conducted by a radial scraper, $i$, attached to the frame of the reel $a$, to an opening and discharge-pipe, $h$, at the bottom of the box $f$. The part of the meal remaining inside of the reel is collected inside of a circular guide-flange, $e'$, at the bottom of the box $f$, and moved by a scraper, $e$, to a second discharge-pipe, $g$, from which it is conducted to a suitable receptacle. The meal or other pulverized substance is conducted in downward direction from the top of the bolting-reel along the bolting-cloth and sifted by the centrifugal force exerted thereon by the interior cylinder. The bolting of the meal is thus accelerated and less space required for the bolting-machines than heretofore.

Having thus described my invention, I claim as new and desire to secure by Letters Patent—

1. In a flour-bolting machine, the combination of an interior vertical cylinder, having horizontal corrugations and exterior spiral beaters, with a concentric corrugated exterior bolting-reel and means for causing them to revolve in opposite directions, substantially as described.

2. In a flour-bolting machine, the combination of an interior vertical cylinder, having horizontal corrugations and exterior spiral beaters, with a concentric corrugated bolting-reel, means for causing them to revolve in opposite directions, and an inclosing-box provided with a top supply-pipe and bottom discharge-pipes, substantially as described.

3. The combination of an interior vertical horizontally-corrugated cylinder, $b$, having spiral beaters $c$, a concentric corrugated bolting-reel, $a$, having bottom scrapers, $i$ and $e$, an inclosing-box, $f$, a supply-pipe, $d$, and discharge-pipes $h$ and $g$, substantially as described.

In testimony that I claim the foregoing as my invention I have signed my name, in presence of two witnesses, this 27th day of November, 1883.

LOUIS JOHANNIS FRIEDERICH WILHELM SCHARBAU.

Witnesses:
ALEXANDER SPECHT,
EMIL HAASE.